Inventors
Lyle C. Atwood
Agnar Johnson
Andrew F. Wintercorn
Atty.

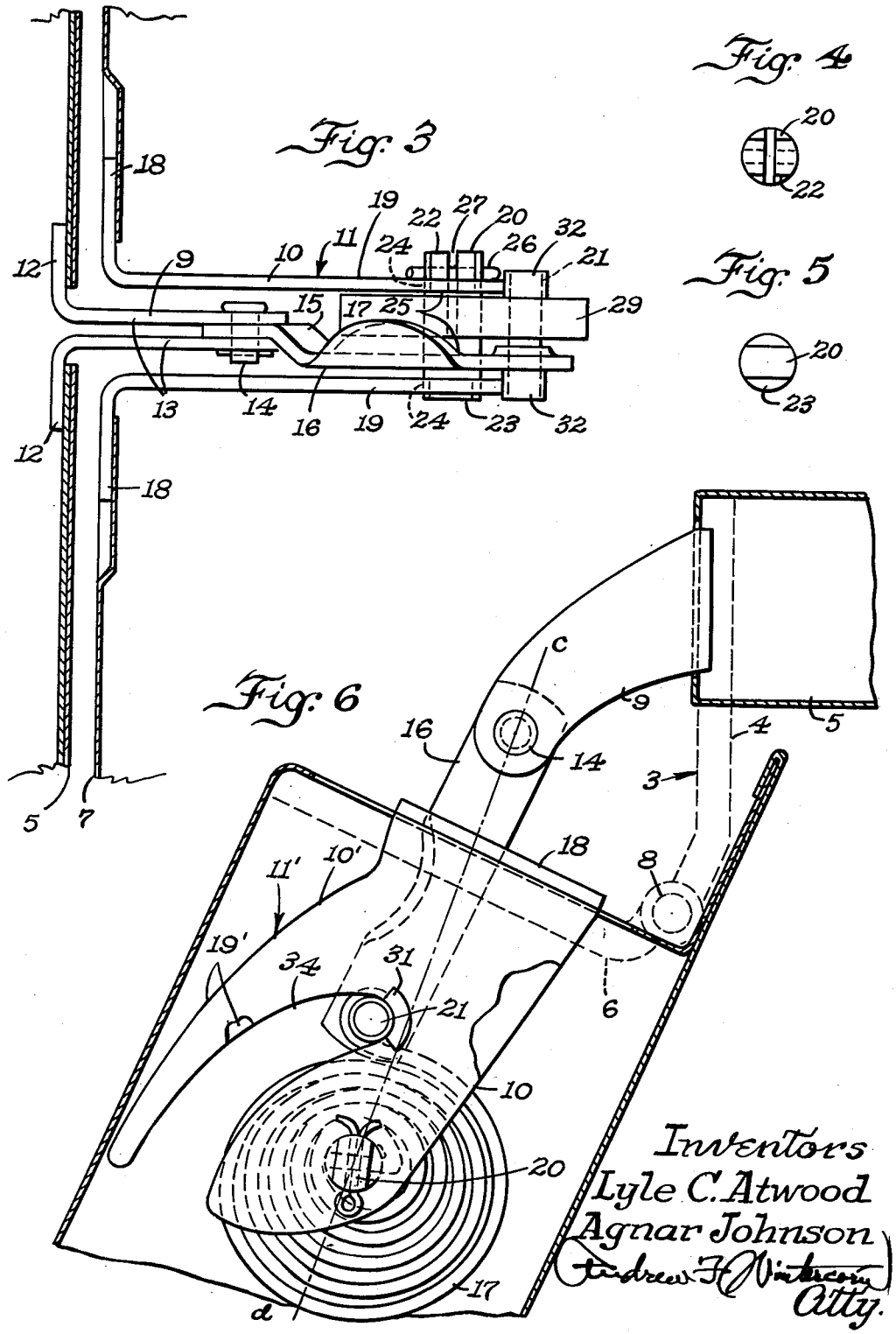

Patented Apr. 20, 1954

2,675,578

UNITED STATES PATENT OFFICE 2,675,578

AUTOMOBILE DOOR CHECK AND HOLD-OPEN DEVICE

Lyle C. Atwood and Agnar Johnson, Rockford, Ill., assignors to Atwood Vacuum Machine Company, Rockford, Ill., a corporation of Illinois Application July 2, 1951, Serial No. 234,718

18 Claims. (Cl. 16—85)

This invention relates to improvements in automobile door check and hold-open devices.

Various combined door check and hold-open devices have been proposed but many were impractical in design and far too complicated and expensive in construction and have not, therefore, been adopted by automobile manufacturers. It is, therefore, the principal object of our invention to provide a device of the kind mentioned which is of simpler and less expensive construction and thoroughly practical and serviceable in design.

In accordance with our invention, a spiral spring is suitably secured at its inner end in a bracket mounted on the door (or door pillar) and has its outer end pivotally connected to one end of a link, the other end of which is pivotally attached to a bracket secured to the door pillar (or door), the arrangement being such that the spiral spring is loaded in the closing of the door for a cushioning action and also for counterbalancing the weight of the door in the opening thereof, thus assisting such opening movement. The link, besides serving to check the door at the limit of its opening, also serves as a hold-open. There are preferably rubber buffer sleeves provided on the opposite end portions of the cross pin on the outer end of the link, which, when brought into engagement with stops provided on the opposed arms of the spring supporting bracket, serve to cushion and silence the operation so that the door opens quietly and there is no evidence of a metal to metal clang or clatter at the limit of door opening movement.

A "pop-out" effect is suitably obtained by the simple expedient of providing a bent-up flange on one edge portion of the link arranged to press against the main body portion of the spiral spring so as to compress the spring radially only in the extreme closed position of the door, whereby to cushion the door closing, reduce likelihood of rattle of the door when the car is in motion, and insure the pop-out effect the instant the door is unlatched, that being particularly important where the doors have a push-button latch.

In the event of breakage of the spring, even though that is rare, the present combination door check and hold-open device may be so designed and constructed that such breakage will not interfere with the opening and closing of the door, the outer end of the link being guided independently of the spring by means of the cross pin in an arcuate slot provided therefor in the opposed arms of the spring supporting bracket.

The invention is illustrated in the accompanying drawings, in which—

Fig. 3 is a side view of the door check and hold-open device taken on the line 3—3 of Fig. 1;

Figs. 4 and 5 are end views of the spring supporting pin, taken from opposite ends, and Fig. 6 is a view similar to Fig. 2 showing a door check and hold-open device of modified or alternative design.

Similar reference numerals are applied to corresponding parts throughout these views.

Figure 1:
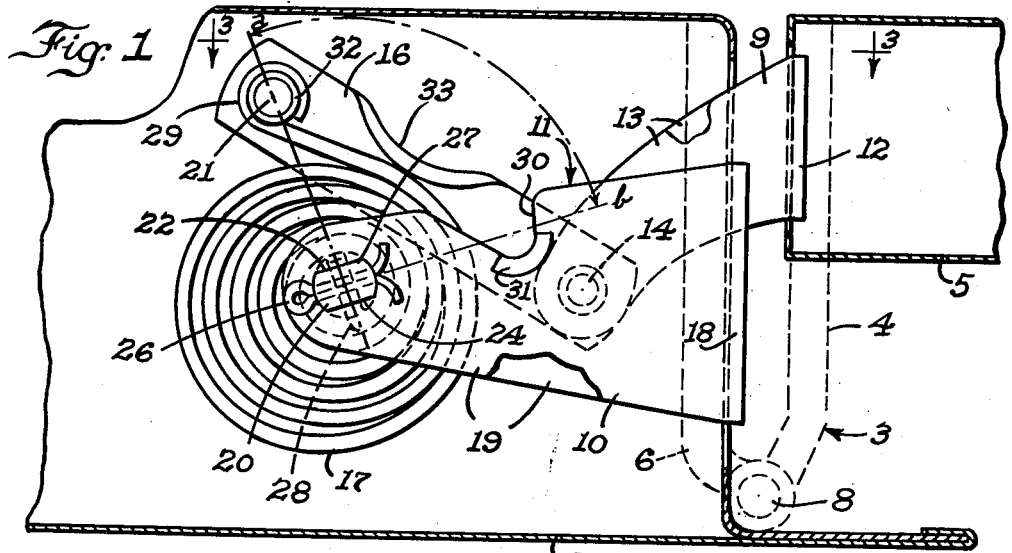
Fig. 1 is a plan view of a combination door check and hold-open device made in accordance with our invention and shown applied to an automobile door and pillar, the door being shown in the closed position.

Referring to the drawings and more particularly to Figs. 1–5, the reference numeral 3 designates a more or less conventional butt type hinge, the one member 4 of which is suitably secured to the door pillar portion 5 of the body and the other member 6 of which is suitably secured to the adjacent edge portion of the door 7, the two hinge members 4 and 6 being pivotally connected by the usual pintle 8. Brackets 9 and 10 forming the attaching end portions of the door check and hold-open device 11 of our invention are shown as suitably secured to the door pillar 5 and door 7, respectively, at the approximate elevation of the conventional door check, namely, at about the middle of the door. However, the arrangement of the brackets 9 and 10 may be reversed, if desired, placing bracket 9 on the door and bracket 10 on the pillar.

Figure 2:
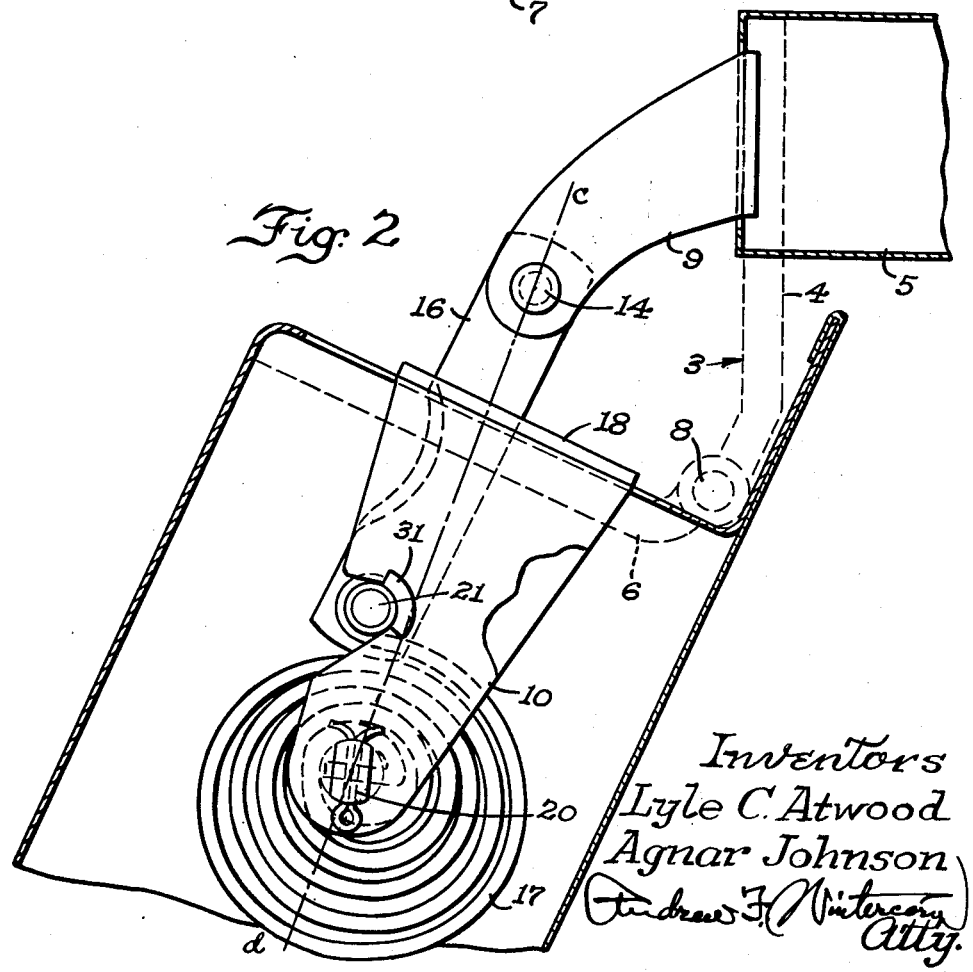
Fig. 2 is a similar view, showing the door opened.

The bracket 9, made up of two L-shaped members secured by their right angle end portions 12 to the door pillar and having their other end portions 13 disposed in closely spaced parallel relationship, as appears in Fig. 3, is pivotally connected by a pin 14 to an offset end portion 15 of a link 16 which serves both as a check link and as a hold-open, the other end portion of said link being connected with the door 7 through the medium of the spiral spring 17. The bracket 10 is likewise made up of two L-shaped members having their right angle end portions 18 secured to the hinging edge portion of the door, as shown in Fig. 2, and having their other end portions 19 disposed in spaced parallel relationship on opposite sides of the link 16. The bracket 10 supports the spiral spring 17 on a pin 20, the spring being anchored at its inner end on the pin and having its outer end pivotally connected with a cross pin 21 that is mounted on the outer end of the link 16. The pin 20 has flats 22 and 23 milled on its opposite ends leaving more or less rectangular end portions, which when entered in correspondingly shaped holes 24 provided in the end portions 19 of bracket 10 hold the pin against turning, besides defining shoulders 25 on opposite ends of the pin, which by abutment with the inner sides of the end portions 19 of bracket 10, hold the pin against endwise displacement relative to the bracket. In addition, a cotter pin 26 may be provided entered through a diametrical hole provided in the upper end portion of the pin to fasten it in assembled relation to the upper half of the bracket 10. The pin is slotted diametrically from one end to a point slightly past the middle, as indicated at 27, in right angle relation to the cotter pin, and the diametrically bent inner end portion 28 of the spiral spring 17 is entered in said slot to anchor the spring on the pin. Now, of course, the spring 17 is of a selected size in relation to door weight and may be, and preferably is, preloaded to whatever extent is necessary so that in the movement of the circularly coiled outer end portion 29 with pin 21 through approximately 90°, indicated by the arc a—b, the spring will be sufficiently loaded additionally to serve the purposes intended. The arc a—b, in other words, indicates the range of spring loading and unloading movement incident to the closing and opening movements of the door. Registering notches 30 are provided in the top and bottom portions 19 of bracket 10 on that side toward the cross pin 21 and the outer end portion 29 of the spring 17 that is connected thereto, these notches being so located intermediate the ends of the bracket 10 so as to receive the end portions of pin 21 when the door reaches its fully opened position. Arcuate bumper flanges 31 are struck outwardly from the top and bottom portions 19 of bracket 10 at the inner ends of the notches 30 so as to provide larger area bearing surfaces for the end portions of the pin 21 to better distribute the load and accordingly reduce wear. Rubber sleeves 32 are preferably provided on the end portions of pin 21 to silence and cushion the bumping of the pin 21 on bumpers 31. An arcuately formed flange 33, struck up from one edge portion of the link 16 intermediate the ends thereof, is arranged to engage the main body portion of the spring 19 near its link attached end 29, as shown in Fig. 1, so as to compress the spring appreciably radially between the flange 33 and pin 20 when the door 7 is closed and thereby provide an additional spring action for what is known as a "pop-out" effect, which is considered highly desirable especially for cars having push-button door latches, because the door pops open slightly under this spring pressure the instant enough pressure has been applied to the push-button to release the latch, and the operator is thereby notified that the door is unlatched and ready to be opened by a pull on the handle.

In operation, when the door 7 is opened, the spiral spring 17 supported on bracket 10 moves with the door relative to the link 16 and, inasmuch as the spring 17, as stated above, is not only preloaded but has been further loaded by movement of its link attached end 29 through 90° in the closing of the door, substantially counterbalances the weight of the door in opening, thereby giving what is known generally as an "assist" action, making it easy to open the door, regardless of whatever considerable weight it may have. At the instant when the push-button on the door handle is pressed to release the door latch the spring 29, which, in the closed position of the door shown in Fig. 1, is cramped or compressed radially between the flange 33 and pin 29, pops ajar to relieve this cramped condition in the spring, thus signalling the operator that the door is in readiness for opening. This cramping of the spring 17 between flange 33 and pin 20 has two other advantages, to wit, it cushions the door closing so that the door will not close with a jar and the danger of glass breakage or shatter even if swung closed violently or under heavy wind pressure, and it furthermore keeps the door hinges 3 and the door latch mechanism (not shown) under spring tension sufficient to reduce, if not entirely eliminate, rattle when the car is in motion. The rate of unwind of the spring 17 incident to opening movement of the door is enough to reduce likelihood of the door opening violently, the spring's thrust in an opening direction being at a maximum when the door is fully closed, as in Fig. 1, and being at a minimum when the door reaches the fully opened position, as shown in Fig. 2. On the other hand, due to the movement of the link 16 in the opening of the door, the spring has an increasingly greater mechanical advantage the farther the door opens, because the link moves closer and closer to a dead-center relationship to the pins 20 and 14, indicated by the dot and dash line c—d in Fig. 2. Consequently, the assist action of spring 19 is noticeable throughout substantially the entire opening movement of the door. On the other hand, the arrival of link 16 so close to a dead-center relationship with respect to pins 20 and 14, is highly desirable insofar as the "hold-open" action of the present device 11 is concerned, because it requires an appreciable push or pull on the door to start swinging it toward closed position, and this accounts for the ability of the device to hold the door open even in the event of fairly heavy wind pressure against it tending to close it. The sound deadening and cushioning action of the rubber sleeves 32 makes the bumping of the pin 21 against bumpers 31 reasonably quiet so that there is no evidence of any jar when the door reaches the fully opened position.

In the modified form, illustrated at 11' in Fig. 6, the construction is identical to that of device 11 except that the bracket 10' has its top and bottom halves 19' made differently from the top and bottom halves 19 of bracket 10, elongated arcuate slots 34 being provided in these members, instead of the short V-shaped notches 30, extending outwardly from the bumpers 31 through a little more than 90° so as to provide retaining guides for the pin 21 and accordingly guide the link 16 independently of spring 17, in the event of breakage of the spring, and accordingly insure freedom of opening and closing movement of the door regardless of the condition of the spring. The slots 34 are long enough in relation to the arc of travel of the outer end of link 16 to contain the pin 21 throughout the range of door opening and closing movement, so that if the spring 17 breaks there is nothing to interfere with operation of the door. The operation is otherwise the same as with the other form.

It is believed that the foregoing description conveys a good understanding of the objects and advantages of our invention. The appended claims have been drawn to cover all legitimate modifications and adaptations.

We claim:

1. A door check and hold-open device comprising two relatively movable brackets adapted to be secured to relatively hinged door and body members, respectively, a spiral spring having its inner end anchored on one of said brackets, and an elongated link pivotally connected at one end to the other of said brackets and having a crosspin on its other end by means of which said link is pivotally connected to the outer end of said spring so as to move it through an appreciable angularity in a winding direction in the movement of the link in one direction incident to closing of the door, said spring supporting bracket having a stop provided thereon arranged to be engaged by said spring connecting pin at the end of door opening movement whereby positively to limit such movement.

2. A door check and hold-open device comprising two relatively movable brackets adapted to be secured to relatively hinged door and body members, respectively, a spiral spring having its inner end anchored on one of said brackets, and an elongated link pivotally connected at one end to the other of said brackets and pivotally connected at its other end to the outer end of said spring so as to move it through an appreciable angularity in a winding direction in the movement of the link in one direction incident to closing of the door, said link being arranged relative to said spring so that its intermediate portion will engage and compress the body portion of said spring radially in the final movement of the link incident to closing of the door, whereby said spring exerts an additional pop-out pressure tending to pop the door open when unlatched.

3. A door check and hold-open device comprising two relatively movable brackets adapted to be secured to relatively hinged door and body members, respectively, a spiral spring having its inner end anchored on one of said brackets, an elongated link pivotally connected at one end to the other of said brackets and pivotally connected by a pin at its other end to the outer end of said spring so as to move it through an appreciable angularity in a winding direction in the movement of the link in one direction incident to closing of the door, said spring supporting bracket having a stop provided thereon arranged to be engaged by said spring connecting pin at the end of door opening movement whereby positively to limit such movement, and a bearing portion on said link intermediate its ends arranged to engage and compress the body portion of said spring radially in the final movement of the link incident to closing of the door, whereby said spring exerts an additional pop-out pressure tending to pop the door open when unlatched.

4. A door check and hold-open device comprising two relatively movable brackets adapted to be secured to relatively hinged door and body members, respectively, a spiral spring having its inner end anchored on one of said brackets, an elongated link pivotally connected at one end to the other of said brackets and pivotally connected at its other end to the outer end of said spring so as to move it through an appreciable angularity in a winding direction in the movement of the link in one direction incident to closing of the door, means on the spring supporting bracket slidably guiding the spring attached end of said link independently of said spring, whereby breakage of the spring cannot interfere with opening and closing the door, and a stop for said link on the spring supporting bracket arranged to be engaged at the end of door opening movement positively limiting such movement.

5. A door check and hold-open device comprising two relatively movable brackets adapted to be secured to relatively hinged door and body members, respectively, a spiral spring having its inner end anchored on one of said brackets, an elongated link pivotally connected at one end to the other of said brackets and pivotally connected by a pin at its other end to the outer end of said spring so as to move it through an appreciable angularity in a winding direction in the movement of the link in one direction incident to closing of the door, said spring supporting bracket having a stop provided thereon arranged to be engaged by said spring connecting pin at the end of door opening movement whereby positively to limit such movement, and guide means on the spring supporting bracket slidably guiding the pin so as to guide the spring attached end of said link in event of breakage of the spring.

6. A door check and hold-open device comprising two relatively movable forked brackets adapted to be secured to relatively hinged door and body members, respectively, one of said brackets being narrow in relation to the other and movable inside the other in nested relationship when the door is closed, an elongated link pivotally connected at one end in the fork of the narrower inner bracket, a spiral spring having its inner end anchored on a pin in the fork of the wider outer bracket and having its outer end movable and pivotally connected to a cross pin on the other end of said link so as to be moved through an appreciable angularity in a winding direction in the movement of the link in one direction incident to closing of the door, and bumpers on the spaced halves of the fork of the spring supporting bracket arranged to be engaged by the end portions of the cross pin at the end of door opening movement positively limiting such movement.

7. A door check and hold-open device comprising two relatively movable forked brackets adapted to be secured to relatively hinged door and body members, respectively, one of said brackets being narrow in relation to the other and movable inside the other in nested relationship when the door is closed, an elongated link pivotally connected at one end in the fork of the narrower inner bracket, and a spiral spring having its inner end anchored on a pin in the fork of the wider outer bracket and having its outer end movable and pivotally connected to the other end of said link so as to be moved through an appreciable angularity in a winding direction in the movement of the link in one direction incident to closing of the door, said link being arranged relative to said spring so that its intermediate portion will engage and compress the body portion of said spring radially in the final movement of the link incident to closing of the door, whereby said spring exerts an additional pop-out pressure tending to pop the door open when unlatched.

8. A door check and hold-open device comprising two relatively movable forked brackets adapted to be secured to relatively hinged door and body members, respectively, and movable one inside the other in nested relationship when the door is closed, an elongated link pivotally connected at one end in the fork of the narrower inner bracket, a spiral spring having its inner end anchored on a pin in the fork of the wider outer bracket and having its outer end movable and pivotally connected to a cross pin on the other end of said link so as to be moved through an appreciable angularity in a winding direction in the movement of the link in one direction incident to closing of the door, bumpers on the spaced halves of the fork of the spring supporting bracket arranged to be engaged by the end portions of the cross pin at the end of door opening movement positively limiting such movement, and a bearing portion on said link intermediate its ends arranged to engage and compress the body portion of said spring radially in the final movement of the link incident to closing of the door, whereby said spring exerts an additional pop-out pressure tending to pop the door open when unlatched.

9. A door check and hold-open device comprising two relatively movable forked brackets adapted to be secured to relatively hinged door and body members, respectively, and movable one inside the other in nested relationship when the door is closed, an elongated link pivotally connected at one end in the fork of the narrower inner bracket, a spiral spring having its inner end anchored on a pin in the fork of the wider outer bracket and having its outer end movable and pivotally connected to the other end of said link so as to be moved through an appreciable angularity in a winding direction in the movement of the link in one direction incident to closing of the door, means on the spring supporting bracket slidably guiding the spring attached end of said link independently of said spring, whereby breakage of the spring cannot interfere with opening and closing the door, and a stop for said link on the spring supporting bracket arranged to be engaged at the end of door opening movement positively limiting such movement.

10. A door check and hold-open device comprising two relatively movable forked brackets adapted to be secured to relatively hinged door and body members, respectively, and movable one inside the other in nested relationship when the door is closed, an elongated link pivotally connected at one end in the fork of the narrower inner bracket, a spiral spring having its inner end anchored on a pin in the fork of the wider outer bracket and having its outer end movable and pivotally connected to a cross pin on the other end of said link so as to be moved through an appreciable angularity in a winding direction in the movement of the link in one direction incident to closing of the door, bumpers on the spaced halves of the fork of the spring supporting bracket arranged to be engaged by the end portions of the cross pin at the end of door opening movement positively limiting such movement, and elongated arcuate guide slots provided in the spaced halves of the fork of the spring supporting bracket slidably receiving the end portions of the cross pin so as to guide the spring attached end of said link in event of breakage of the spring.

11. A device as set forth in claim 1 including a sleeve of resilient sound deadening cushioning material provided on said pin for noiseless abutment with said stop.

12. A device as set forth in claim 5 including a sleeve of resilient sound deadening cushioning material provided on said pin for noiseless abutment with said stop.

13. A device as set forth in claim 6 including a sleeve of resilient sound deadening cushioning material provided on said pin for noiseless abutment with said bumpers.

14. A device as set forth in claim 10 including a sleeve of resilient sound deadening cushioning material provided on said pin for noiseless abutment with said bumpers.

15. A door check and hold-open device comprising two relatively movable brackets adapted to be secured to relatively hinged door and body members, respectively, a spiral spring having its inner end anchored on one of said brackets, an elongated link pivotally connected at one end to the other of said brackets and pivotally connected by a pin at its other end to the outer end of said spring so as to move it through an appreciable angularity in a winding direction in the movement of the link in one direction incident to closing of the door, means on the spring supporting bracket slidably guiding the spring attached end of said link independently of said spring, whereby breakage of the spring cannot interfere with opening and closing the door, a stop for said link on the spring supporting bracket arranged to be engaged at the end of door opening movement positively limiting such movement, and a bearing portion on said link intermediate its ends arranged to engage and compress the body portion of said spring radially in the final movement of the link incident to closing of the door, whereby said spring exerts an additional pop-out pressure tending to pop the door open when unlatched.

16. A door check and hold-open device comprising two relatively movable brackets adapted to be secured to relatively hinged door and body members, respectively, a spiral spring having its inner end anchored on one of said brackets, an elongated link pivotally connected at one end to the other of said brackets and pivotally connected by a pin at its other end to the outer end of said spring so as to move it through an appreciable angularity in a winding direction in the movement of the link in one direction incident to closing of the door, said spring supporting bracket having a stop provided thereon arranged to be engaged by said spring connecting pin at the end of door opening movement whereby positively to limit such movement, a bearing portion on said link intermediate its ends arranged to engage and compress the body portion of said spring radially in the final movement of the link incident to closing of the door, whereby said spring exerts an additional pop-out pressure tending to pop the door open when unlatched, and guide means on the spring supporting bracket slidably guiding the pin so as to guide the spring attached end of said link in event of breakage of the spring.

17. A door check and hold-open device comprising two relatively movable forked brackets adapted to be secured to relatively hinged door and body members, respectively, and movable one inside the other in nested relationship when the door is closed, an elongated link pivotally connected at one end in the fork of the narrower inner bracket, a spiral spring having its inner end anchored on a pin in the fork of the wider outer bracket and having its outer end movable and pivotally connected to a cross pin on the other end of said link so as to be moved through an appreciable angularity in a winding direction in the movement of the link in one direction incident to closing of the door, means on the spring supporting bracket slidably guiding the spring attached end of said link independently of said spring, whereby breakage of the spring cannot interfere with opening and closing the door, a stop for said link on the spring supporting bracket arranged to be engaged at the end of door opening movement positively limiting such movement, and a bearing portion on said link intermediate its ends arranged to engage and compress the body portion of said spring radially in the final movement of the link incident to closing of the door, whereby said spring exerts an additional pop-out pressure tending to pop the door open when unlatched.

18. A door check and hold-open device comprising two relatively movable forked brackets adapted to be secured to relatively hinged door and body members, respectively, and movable one inside the other in nested relationship when the door is closed, an elongated link pivotally connected at one end in the fork of the narrower inner bracket, a spiral spring having its inner end anchored on a pin in the fork of the wider outer bracket and having its outer end movable and pivotally connected to a cross pin on the other end of said link so as to be moved through an appreciable angularity in a winding direction in the movement of the link in one direction incident to closing of the door, bumpers on the spaced halves of the fork of the spring supporting bracket arranged to be engaged by the end portions of the cross pin at the end of door opening movement positively limiting such movement, a bearing portion on said link intermediate its ends arranged to engage and compress the body portion of said spring radially in the final movement of the link incident to closing of the door, whereby said spring exerts an additional pop-out pressure tending to pop the door open when unlatched, and elongated arcuate guide slots provided in the spaced halves of the fork of the spring supporting bracket slidably receiving the end portions of the cross pin so as to guide the spring attached end of said link in event of breakage of the spring.

References Cited in the file of this patent

UNITED STATES PATENTS

| Number | Name | Date |
| --- | --- | --- |
| Re. 23,191 | Riley | Jan. 17, 1950 |
| 2,149,074 | Runkle | Feb. 28, 1939 |
| 2,272,230 | VanVoorhees | Feb. 10, 1942 |
| 2,580,593 | Putnam | Jan. 1, 1952 |